March 24, 1931.  C. S. BRAGG ET AL  1,797,853
POWER ACTUATOR
Original Filed Dec. 22, 1923  3 Sheets-Sheet 1

March 24, 1931. C. S. BRAGG ET AL 1,797,853
POWER ACTUATOR
Original Filed Dec. 22, 1923   3 Sheets-Sheet 2

INVENTORS
Caleb S. Bragg and
Victor W. Kliesrath
BY
Louis Prevost Whitaker
their ATTORNEY March 24, 1931.  C. S. BRAGG ET AL  1,797,853

POWER ACTUATOR

Original Filed Dec. 22, 1923    3 Sheets-Sheet 3

Patented Mar. 24, 1931

1,797,853

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed December 22, 1923, Serial No. 682,346. Renewed July 5, 1928.

Our invention consists in the novel features hereinafter described, reference being had to the accompanying drawings, which illustrate one embodiment of the same, selected by us for purposes of illustration, and the said invention is fully disclosed in the following description and claims.

The object of our invention is to provide a power actuator for the operation of brakes, gear shifts, clutches, steering gear, or other devices ordinarily operated manually, by hand or foot, by means of which the actual operation of the device may be effected by power under the most minute manual control as to extent and direction of movement and degree of applied pressure or force, the manual control operating in same directions and to substantially the same extent as in similar installations operating wholly under manual operation, provision being also made for enabling the actuated device to be manually operated in the usual direction and to the desired extent under any and all conditions in case of the failure for any reason of the power actuating mechanism. In other words, our new mechanism supplements the usual manual operations by effecting the actual work by power actuated means so as to relieve the operator of the labor and fatigue consequent upon the actual exertion of the necessary power to effect the desired movements of the actuated devices, while preserving the same delicacy of adjustment and application of power which is obtained by manual operation, and in addition providing a practically fool-proof mechanism in which the manual operations can assert themselves to actually apply the power in the desired direction and to the desired extent in case of the failure of the power actuating mechanism. Our improved power actuator can therefore be readily inserted in and made part of connecting means interposed between any ordinary device or mechanism now or usually operated manually, and the manually operated devices for actuating the same without the necessity of teaching the operators new methods of operation, with consequent liability of accident should the power actuator at any time or for any reason fail to function.

In carrying our invention into effect, we preferably employ a power cylinder and a double acting piston therein, movable in both directions by establishing differential pressures on opposite faces of the piston under the control of valve mechanism by which the higher and lower pressures may be reversed with respect to the piston and by which the cylinder can be cut off from the sources of both the higher and lower pressures to hold the piston in any desired arrested or interjacent position. In practice the apparatus can be operated in connection with any desired means for establishing differential pressures, as for example, means for producing a partial vacuum, such as a suction device with or without a vacuum tank may be used for the lower pressure and air at atmospheric pressure may be relied upon for the higher pressure, or a fluid compressed above atmospheric pressure may be relied upon for the higher pressure, or we may employ compressed motor fluid above atmospheric pressure for the higher pressure, and a partial vacuum produced by suction mechanism for the lower pressure, and whether compressed fluid or suction or both are used storage or equalizing tanks may or may not be employed in accordance with the requirements of the installation.

Our power actuator is exceptionally well adapted for use in connection with internal combustion engines which at all times during their operation present differential pressures. Thus there is a suction produced by the cylinders in drawing in the charges of explosive mixture, between the cylinders and the throttle valve, which is at its maximum when the engine is throttled down, and decreases as the throttle is opened. There is also high compression in the cylinders which is greatest when the throttle is wide open and decreases as the throttle is closed. Our power actuator can therefore be readily operated by the suction from the intake manifold, or by compressed gases from a cylinder of the engine, or by both as preferred.

In the accompanying drawings we have selected three practical applications of our invention for purposes of illustration one being its application to the operation of the brake or brakes of an automotive vehicle, another to the operation of steering mechanism of a power boat or vessel and the third to the simultaneous operation of brake mechanism on an automotive vehicle and a trailer drawn thereby. In the case of an automotive vehicle, the brakes would be applied simultaneously with the slowing down or throttling of the engine, so that the suction of the manifold between the cylinder and throttle valve would be substantially at its maximum when the brakes would be applied. Therefore it is convenient to arrange for the operation of the power actuator for this purpose, by using the suction of the engine on one side of the power piston and normal air pressure on the other. In the case of a motor boat or other vessel, however, where the power actuator is employed to operate the steering mechanism (for throwing a clutch or gear shift mechanism) the situation is quite different as these operations might be and in many cases would be performed when the engine was operating at open or full throttle, as well as when throttled down and in such case there might not be sufficient suction with the throttle wide open, for example, to insure the quick and certain operation of the actuator. In such case, therefore, we prefer to tap one of the engine cylinders in a well known way and take a portion of the burnt gases under pressure into a pressure tank to supply the higher pressure for one side of the piston using the suction from the intake manifold for the lower pressure which will insure the necessary power under all conditions. Thus, if the engine were merely idling and it was desirable to operate the actuator to operate steering mechanism, clutch, gear shift, or other device, the pressure in the engine cylinder would not be at its maximum, but the suction at the manifold would be at its maximum and would insure the correct operation, even if there was a reduction of pressure in the pressure tank. On the other hand, if the engine was operating at full throttle and the suction was below the maximum the pressure would be accumulated in the pressure tank so that the operation of the actuator would be insured under those conditions.

In the accompanying drawings.

Figure 1:
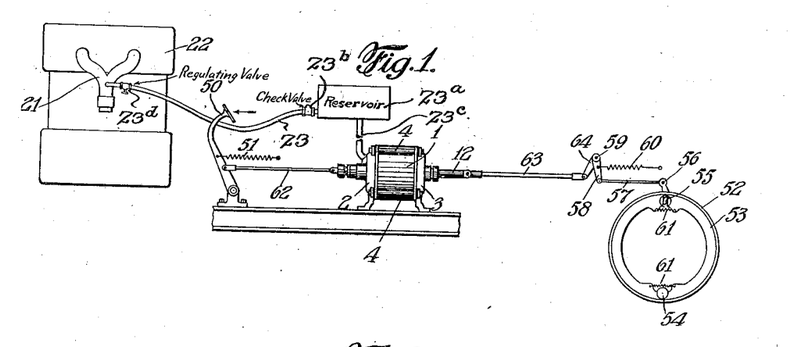
Fig. 1 represents a diagrammatic view showing our improved actuator fixed in the connections between the service brake lever and the brakes of an automobile, and also connected to the intake manifold of the engine, for the purpose of providing the lower pressure, the power actuator being shown in elevation.

Referring to the drawings, 1, represents the power cylinder of our power actuator, which is preferably formed with both ends open, the ends being closed by front and rear heads, respectively indicated at 2—3, secured to the cylinder in the desired manner, as by connecting bolts, 4, see Fig. 1.

Figure 2:
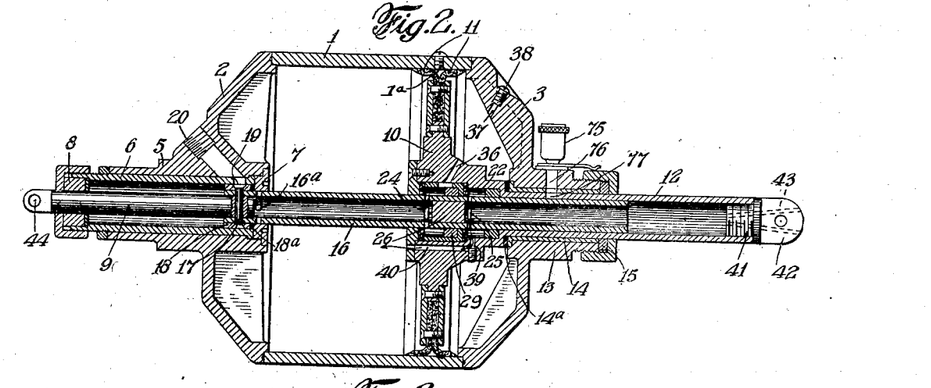
Fig. 2 is a section view of our power actuator, detached, showing the parts in normal position.
Figure 6:
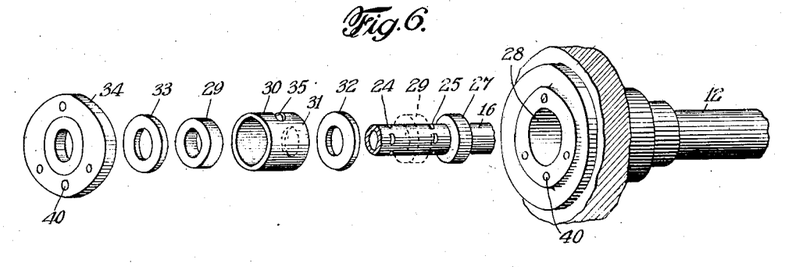
Fig. 6 is a detail perspective view showing a portion of the piston and the valve mechanism in detached or separated relations, to illustrate graphically the component parts of the valve mechanism.

The forward head, 2, of the cylinder is provided with a guiding sleeve, 5, in which is fitted a bushing, 6, held in position by an annular guiding ring, 7, at the inner end of the sleeve, the outer end of the sleeve being provided with a stuffing box, indicated at 8, through which extends a longitudinally movable valve actuating rod, 9. Within the cylinder, 1, is a double acting piston, indicated at 10, and provided preferably with annular gaskets, 11—11, extending in opposite directions and engaging the inner surface of the cylinder wall. The piston, 10, is provided with a tubular extension, 12, which extends through a guiding sleeve, 13, bushing, 14, and stuffing box, 15, with which the rear head, 3, of the cylinder is provided. I prefer to provide an annular packing, 14a, located between the end of the bushing, 14, and a shoulder at the junction between the piston and the extension, or piston rod, 12, as shown in the drawings to assist in making a tight joint and to cushion the return movement of the piston. 16 represents a longitudinally movable valve sleeve, fitting the internal bore of the extension, 12, extending through the cylinder from one end to the other and having its forward end connected to the valve actuating rod, 9. In the present instance I have shown the valve sleeve, 16, connected to the stem, 9, by rivet, 17, which also passes through a valve collar, 18, on the exterior of the sleeve, 16, having its exterior surface ground to fit the interior of the bushing, 6, and adapted to close a small port, indicated at 19, in said bushing which communicates with a passage, 20, leading to the source of lower pressure, as for example, the intake manifold, 21, of an internal combustion engine, 22, to which it is shown connected in Fig. 1, by a pipe, 23. An annular valve seat, 18a, of leather or other suitable material engages the end of the collar, 18, to further insure a tight joint. I prefer to insert in the pipe line, 23, a vacuum tank, 23a, and check valve, 23b, as shown in Fig. 1, and to connect the tank by a pipe, 23c, of considerable diameter, with the passage, 20, of the power actuator in order that a partial vacuum may be maintained at all times in this tank, so as to insure quick response of the actuator as soon as the valve mechanism has placed the cylinder in communication with the tank. As the operation of the brake mechanism and consequent suction through the pipes, 23, to the manifold will have the effect of varying the percentage of air in the explosive mixture, I prefer to locate in the pipe, 23, a regulating valve, 23d, which can be so adjusted, while the engine is running idle and fully throttled, and the power actuator is being operated, so as to provide the necessary suction without danger of stalling the engine. The valve sleeve, 16, fits snugly in the central aperture of the guiding ring, 7, and is provided in rear of the valve, 18, and within the collar, 7, with an annular series of ports, 16a. When the parts are in normal position, as shown in Fig. 2, for example, the port, 19, will be closed by the collar, 18, and the ports, 16a, will be closed by the guiding ring, 7. The valve, 16, is provided with two annular series of openings, indicated at 24 and 25, respectively, located in different transverse planes lengthwise of the sleeve and the interior of the sleeve is provided with a partition or plug, 26, between these two series of openings, which may be referred to as the higher and lower pressure openings respectively, 24, being the lower pressure openings, and, 25, the higher pressure openings of the valve mechanism. The sleeve, 16, is also provided on its exterior with a valve or collar, 27, rigidly secured thereto in rear of the high pressure openings, 25, the said collar having its peripheral surface ground to fit a chamber, 28, in the interior of the piston, 10, and to engage a shoulder at the rear end of the chamber when in normal position, as shown in Fig. 2, for example. The sleeve, 16, is also provided with a similar valve or collar, 29, between the two series of apertures, 24 and 25, and adapted to fit within a bushing, 30, within the piston, 10, the bushing being provided at its rear end with a shoulder, 31, against which the collar, 29, abuts when the parts are in normal position, as shown in Fig. 2. In Fig. 6, the collar, 29, is shown detached, as is also the bushing, 30, but the position on the sleeve, 16, occupied by the collar 29, is indicated in dotted lines. In rear of the bushing, 30, is an auxiliary valve seat, 32, which may consist in this instance of a washer of leather or other suitable material, which will thus be held between the rear end of the bushing 30, and a shoulder formed in the piston so as to be engaged by the sliding valve or collar, 27, when the sleeve, 16, is moved forwardly a sufficient distance, which in this instance is $\frac{7}{16}$ of an inch. A similar valve seat, 33, is provided for the valve or collar, 29, which is located at the forward end of the bushing, 30, and the bushing, 30, and valve seats, 32 and 33, are held in position by a clamping ring, 34, secured to the forward side of the piston in any desired manner as by screws, as shown. The bushing, 30, is provided with a port, 35, communicating with the cylinder in rear of the piston, by means of passages 36. The rear head of the cylinder is provided with a passage, 37, in exact alignment with the passages, 36, and closed by a screw, 38. By means of this screw access may be had to the passages, 36, for oiling the valve mechanism when desired. The chamber, 28, is also provided with a port, 39, communicating by a passage, 40, extending through the piston, with the cylinder on the forward side of the piston. The rear end of the hollow extension, 12, which is really the piston rod, is conveniently provided with a block, 41, having an attaching eye, 42, and the plug, 41, is also provided with a port or ports, 43, for the admission of atmospheric air when air is used for the high pressure and suction for the low pressure in actuating the piston. The forward end of the rod, 9, is provided with an attaching eye, 44.

The mechanism just described may be inserted in fixed position in any connections between a manually operated part, as a hand lever, foot pedal, for example, and the mechanism to be actuated thereby, as for example, brake mechanism, clutch mechanism, steering mechanism, gear shift mechanism, etc. In Fig. 1 we have shown our improved actuator inserted in the connection between a foot lever, indicated at 50, and provided with the usual retracting spring, 51, and the brake mechanism of an automobile, by way of example, the parts being indicated diagrammatically in Fig. 1, in which the rear wheel brake bands are indicated at, 52, the brake shoes, at 53, pivoted at 54, and operated by a cam or eccentric, 55, by means of an arm, 56, connected by a link, 57, to an arm, 58, on the rock shaft, 59, a retracting spring, 60 being provided for the rock shaft, 59, and retracting springs, 61, being provided for the brake segments or shoes, 53. This brake mechanism is of known construction and forms no part of our present invention. The cylinder of the actuator is supported in fixed position with respect to the chassis of the automobile or other automotive vehicle, in any desired manner. The forward end of the valve rod, 9, of the actuator is connected by a link, 62, or rod, with the brake lever, 50, and the piston rod or extension, 12, is connected by a link, 63 with an arm, 64, on the rock shaft, 59. This represents a conventional assembly where our improved actuator is interposed in the connections between the foot actuated brake lever and the rock shaft for applying the brakes to the rear wheels of an automobile, but it is to be understood that our improved actuator can be used in any other type of brake mechanism or in the connections for actuating other mechanical devices than brakes, such as those enumerated heretofore, and others.

Figure 4:
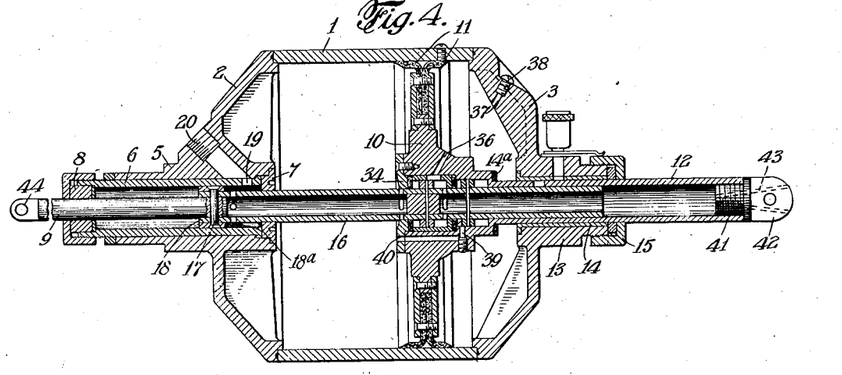
Fig. 4 is another similar view showing the piston moved forwardly far enough to close the ports communicating with the higher and lower pressures, and the parts held stationary in an arrested interjacent position.

Referring now to the operation of our improved power actuator, it will be noted that the rod, 9, and valve sleeve, 16, have a certain amount of lost motion with respect to the piston. In this instance this lost motion amounts to $\frac{7}{18}$ of an inch, but we do not wish to be limited to this exact distance. In any event, it is the distance which the valve sleeve, 16, must be moved forward from its normal position before bringing the valve or collars, 29 and 27, into contact with the valve seats, 33 and 32 respectively. Referring now to Fig. 2, which represents the position of the parts of our improved power actuator when in normal position, and assuming that, as indicated in Fig. 1, the passage, 20, in the forward head is connected with the vacuum tank and intake manifold of the automobile engine, and that the ports, 43, at the rear end of the piston rod or extension, 12, are open to the atmosphere, it will be seen that in this position of the valve mechanism, atmospheric air has free access to the front side of the piston through the hollow piston rod, 12, the rear end of the sleeve, 16, the ports, 25, in the sleeve, 16, the port, 39, and passage, 40, in the piston. In this position of the piston, all connection between the cylinder and the suction means is cut off by the valve, 18, on the valve sleeve, 16, which in this position of the valve mechanism closes the port, 19, in the bushing, 6. If now, it is desired to apply the brake mechanism or otherwise operate the power actuator, the foot pedal, 50, is moved forward in the direction of the arrow, Fig. 1, against its retracting spring, 51, thereby drawing forward the valve sleeve, 16. As the sleeve, 16, moves forward, the ports, 24, are withdrawn from the piston and brought into communication with the portion of the cylinder forward of the piston, which is thus placed in communication with the suction tank. Simultaneously the collar valves, 29 and 27, are moved forward within the bushing, 30, cutting off the rear portion of the cylinder from the passage, 40, and establishing communication between the atmospheric air or higher pressure inlet, 43, and the portion of the cylinder in rear of the piston through the ports, 25, the port 35, in the bushing, 30, and the passages 36, in the piston. The effect of the suction mechanism produced in this instance by the suction of the engine itself, although it might be produced by other suction means, is to rapidly exhaust the air from the cylinder on the forward side of the piston, and as the opposite end of the cylinder is in communication with the atmosphere, the piston will instantly move forward. If no further movement of the foot lever is made, the piston will simply move far enough to bring the piston over the aperture, 24, in the valve sleeve, see Fig. 4, thus cutting off the communication between the suction mechanism and the interior of the cylinder forward of the piston, and thus holding the parts arrested in this position. It is to be noted that a certain amount of rarifaction has been produced in the cylinder forward of the piston followed by an immediate forward movement of the piston under the pressure of atmospheric air, until the piston is brought into a balanced condition, in which it will remain as the communication with the suction mechanism is cut off, and no atmospheric air can be admitted to the forward side of the piston. If the foot lever is further depressed so as to move the valve sleeve further forward and again bring the ports, 24, outside of the piston and into communication with the cylinder, the rarefaction of the air on the forward side of the piston will be instantly resumed, as will the forward movement of the piston. As a matter of fact, the movement of the piston follows so instantaneously the forward movement of the foot lever, that the foot lever may be moved forward any desired distance before arresting it, and the piston will follow the movement and stop practically instantaneously when the forward movement of the foot lever stops, as the additional movement of the piston in stopping is only equal to the width longitudinally of the sleeve, 16, of the valve ports, 24. There is therefore no backward surging of the piston, and no relief of pressure exerted thereby, but the force or pressure exerted by the piston can be as delicately and accurately gauged by the feeling of the foot as though the power were actually being applied by the foot itself, and will be maintained just as long as the position of the foot on the lever is maintained stationary. At the same time it is to be understood that the muscles of the foot do not perform anything in the way of exertion beyond overcoming the resistance of the retracting spring, which may be employed in connection with the foot lever, so that the muscles are relieved of all fatigue or strain while the delicacy of manipulation of the actuated mechanism is preserved to the same extent as where the actuated part is directly moved by muscular exertion.

When the piston has been moved forwardly so as to exert its maximum pressure on the brake, the further movement of the foot lever will bring the collar valves, 29 and 27, against their auxiliary valve seats, 33 and 32 respectively, thereby additionally sealing the valve mechanism, and as this marks the limit of the lost motion provided between the actuating part, to wit, the foot lever, and the actuated part, to wit, the piston rod, the further pressure of the foot on the pedal will add the operator's strength to the power exerted by the power actuator should this be or become necessary.

It will be obvious that in this construction the extent to which the operator's foot moves the pedal forward to enable the actuator to apply the maximum power will depend upon the distance between the friction surfaces of the brake mechanisms, and will vary as the friction surfaces wear. The extent to which the pedal lever is depressed to fully apply the brakes serves, therefore, to indicate the amount of wear on the friction surfaces, and obviously the pedal lever must always be capable of further movement after the brakes have been applied by power to add the physical force of the operator.

Figures 5, 8:
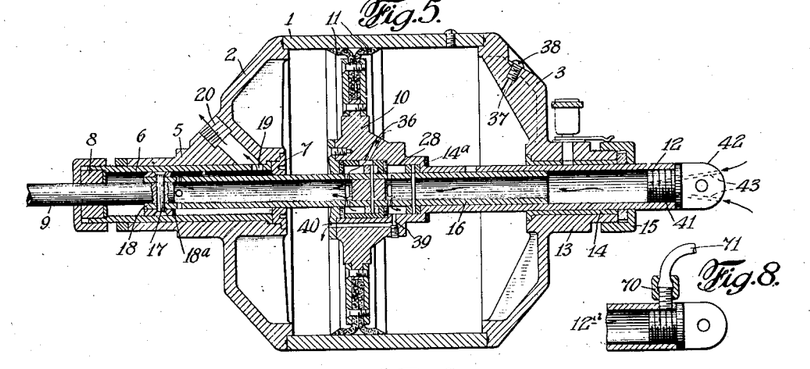
Fig. 5 is another view similar to Fig. 2, showing the valve mechanism reversed with respect to the piston so as to effect the return movement of the piston by the same power which moved it forward.
Fig. 8 is a detail view of a slight modification showing how pressure pipe may be connected to air intake of Fig. 1.

The instant the pressure of the foot on the foot lever, 50, is relieved, the lever moves rearward under the action of its retracting spring, thus moving the valve sleeve, 16, rearward, and this shifts the valves, 29 and 27, into the positions indicated in Fig. 5 so as to place the forward portion of the cylinder in communication with the atmosphere through ports, 25, 39 and 40, while the suction mechanism is placed in communication with the cylinder in rear of the piston through ports, 24, 35 and 36. This causes the immediate return movement of the piston, which is assisted by the retracting spring, 60, of the brake mechanism, and if the foot is continually relieved from the foot lever, the piston will return to normal position, although this return movement can be arrested at any moment by checking the return movement of the foot lever, which will instantly cause a shifting of the piston and valve mechanism into the arrested or interjacent position shown in Fig. 4.

It will thus be seen that the cylinder is connected with a source of higher pressure and a source of lower pressure and that the valve mechanism is so constructed and arranged as to reverse the connections between those sources and the respective ends of the cylinders to move the piston in one direction or the reverse direction, or to disconnect both ends of the cylinder from said sources to arrest the movement of the piston and hold it stationary in balanced condition. In Fig. 8 I have shown the hollow piston rod, indicated at 12a, provided with a connection, 70, communicating with the interior of the hollow piston rod. By connecting the connection, 70, by flexible piping, 71, for example, with any source of pressure fluid, as a cylinder of an internal combustion engine, the device will operate in exactly the same manner. In some instances where a pressure fluid is employed, the suction may be dispensed with if desired, by placing the passage, 20, in communication with the atmosphere.

Figure 3:
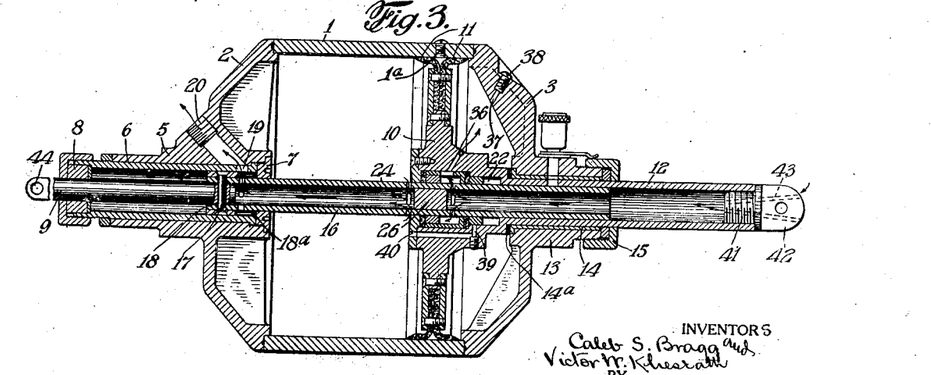
Fig. 3 is a similar view showing the valve mechanism moved into position to cause the forward movement of the piston.

In the construction of our power actuator, it has been found most important to provide fluid tight valve constructions, in order to prevent leakage on either side of the piston during the operation of the device. It is to be noted that the suction port, 19, or lower pressure port, is entirely shut off from the internal valve mechanism when the parts are in normal position, see Fig. 2, by the ground valve or collar, 18, and seat, 18a, which closes the port, 19, and the ring, 7, which closes the ports, 16a, in the valve sleeve, 16, the only channel of communication which is open being that through the hollow piston rod, 12, the sleeve, 16, ports 25, 39 and 40, connecting the source of higher pressure, in this case atmospheric air, with the cylinder forward of the piston. When the valve sleeve, 16, is moved forward into open position, as shown in Fig. 3, the ground valve collars, 29 and 27, will be brought into engagement with the auxiliary valve seats, 33 and 32, respectively, so that there can be no leakage of air into the portion of the cylinder forward of the piston where the suction is taking place to interfere with the rapid attenuation of the air in that portion of the cylinder. This is secured both by the fit of the valve collars themselves in their enclosing parts, and also by contact between the front faces of said collar valves and the auxiliary seats of leather or other suitable material. When the valve mechanism is in the interjacent position shown in Fig. 4, the suction can only act as far as the ports, 24, in the valve sleeve which are closed by the walls of the piston plate, 34, and the atmospheric air is cut off from the forward side of the piston by the collar valve, 27, closing the port, 39.

It will be seen from the foregoing description that when our power actuator is inserted and fixed in the connections between a manually operated lever or pedal and the part to be actuated, the pedal or lever is operated in substantially the same direction and manner and to substantially the same extent that it would be if it was directly connected to the actuated device, the only difference being that the actual power transmitted to the actuated device is furnished by the power cylinder, and the piston, under delicate control of the manually operated lever or pedal, and the operator is relieved from the exertion which would be necessary to apply the power directly. Another important feature of our power actuator, is, as before stated, that should the power actuator for any reason fail to operate, the manually operated device can immediately assert itself and provide the necessary power to operate the actuated device. This is due to the provision of lost motion between the valve sleeve, 16, and the piston. Assuming, for example, that unknown to the operator the suction pipe, 23, connecting the passage, 20, of the cylinder with the intake manifold has become broken or injured so that it leaks, as might occur by accident or otherwise, and the operator desires to apply the brakes, by moving the foot lever, 50, forward until the parts are brought into the position indicated in Fig. 3, with the valve collars, 29 and 27, in contact with the auxiliary seats, 33 and 32, there would be no suction to effect the forward movement of the piston, but in such case the operator, by simply pressing the pedal, 54, forward to a greater extent, can positively move the piston and piston rod, 12, to the desired extent to apply the brakes with the desired force by the exertion of the necessary muscular strength and the only additional effort required would be the friction of the parts, which would be negligible. The forward movement of the piston would not be retarded by any compression within the cylinder as the valve mechanism being in the position indicated in Fig. 3, atmospheric air could flow into the cylinder in rear of the piston and be discharged freely from the cylinder in advance of the piston through the ports, 24, 16a, 19, and passage, 20. After applying the brakes, when the pedal is released, the retracting springs 51 and 60, would insure the rearward movement of the sleeve, 16, and as soon as the collar valves, 29 and 27, have reached the rear end of their limited movement, permitted by the provision for lost motion between the sleeve and piston, the spring, 60, would move back to its normal position, air being admitted through the port, 39, and passage, 40, to the forward side of said piston, and air being expelled through the passage, 36, port, 35, and ports, 24, and thence through the passage, 20, to the atmosphere. The apparatus herein described can therefore be inserted and fixed in the connections between any ordinary manually operated device and the part or parts to be actuated thereby without danger of accident which might otherwise result by a failure of the power actuated mechanism, as in the event of such failure the manual operation of the actuated part can be readily effected in exactly the same manner that it would be if the power actuated device was not in the connections except for the slight lost motion provided in the valve mechanism and the equally slight retardation due to the friction of the parts which would not in any way interfere with the proper operation of the actuated part.

Suitable means for lubricating the moving parts of the power actuator can be provided by means of oil cups, oil saturated packings for the stuffing boxes, and otherwise, as is customary in power operated devices. In the drawing we have shown an oil cup, 75, on the rear head of the cylinder, communicating by passage, 76, with the bushing through which the hollow piston rod or stem, 12, slides, and by an aperture in the piston rod, indicated at 77, with the valve sleeve for lubricating these parts.

The interior of the valve mechanism can be oiled by removing the screw, 38, and inserting a long necked oiler into the passage, 36. The cylinder, 1, is also preferably provided with an oil hole closed by a screw, 1a, which can be removed to permit of lubricating the cylinder walls and piston leathers, 11.

The vacuum storage tank, the regulating valve and the check valve, interposed in the connections between the reversing valve mechanism of the actuator, and the charge introducing suction passage of the engine between the throttle valve and the cylinder, or cylinders, ordinarily the intake manifold, perform important functions in connection with our improved actuator. If the suction passage were directly connected to the actuator, the air withdrawn from the actuator, if withdrawn sufficiently rapidly to insure the prompt operation of the actuator, would be carried into the suction passage so rapidly as to be likely to stall the engine if idling, by diluting too greatly the explosive charge as, when the throttle is closed (as it should be when the actuator is used to operate a brake), the greatest possible rarefication will take place within the suction passage. When the throttle is wide open, there is little or no rarefication produced. If the connection was restricted so as to prevent the too rapid delivery of the air withdrawn from the actuator into the suction passage of the engine, it would be necessary to wait over an interval of time until a sufficient quantity of air has been exhausted from the actuator to operate it. By placing a tank or storage space in the connections as shown and described, and maintaining a condition of rarefication within the same, it is possible to secure the instantaneous operation of the actuator and at the same time avoid having the exhaust air pass to the suction passage with sufficient rapidity to stall the engine. The restricting device, or regulating valve which is interposed between the storage space or vacuum tank and the suction passage, restricts the passage of air withdrawn from the actuator cylinder into the suction passage or intake manifold, and this cooperates with the tank in insuring the operation of the actuator and preventing the stalling of the engine. It will also be seen further, that as the degree of rarefication in the suction passage varies continuously with the opening or closing of the throttle, the degree of rarefication in the vacuum tank, or storage space, would be continually varying if it were not for the provision of the check valve. By the employment of this check valve, the maximum rarefication within the vacuum tank or storage space, will be obtained the first time the throttle valve of the engine is closed, as in changing gears, etc. The vacuum tank gives the necessary capacity and the check valve maintains this maximum rarefication, so that both are instantaneously available whenever it is desired to operate the actuator, as, for example, in applying the brake, thus obtaining accelerated, and practically instantaneous action of the actuator without danger of stalling the motor on the one hand, and without the necessity of waiting until the necessary quantity of air could be exhausted by the motor on the other. It is to be understood that it is particularly important in the operation of our improved actuator not to stall the motor as the vacuum would be destroyed if the engine is not functioning.

Figures 7, 9, 10, 11, 12:
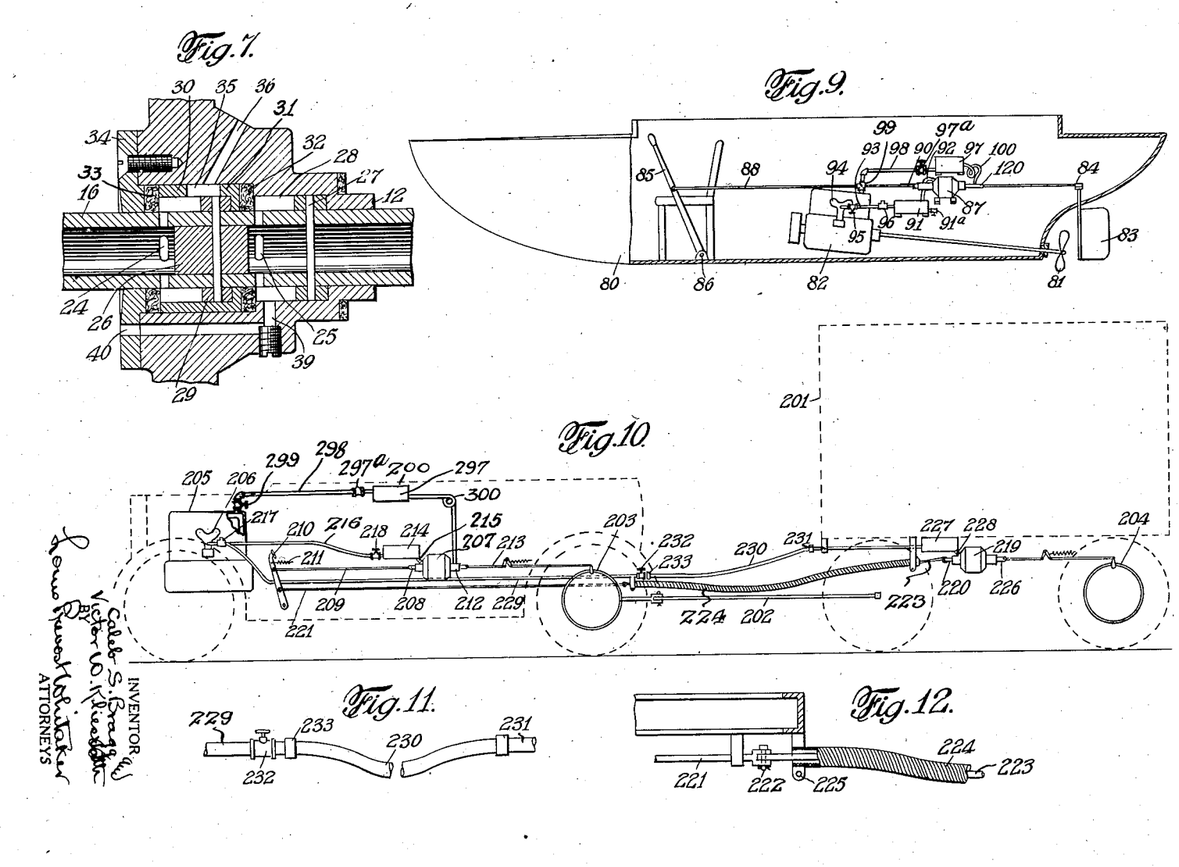
Fig. 7 is an enlarged detail sectional view of the controlling valve mechanism for the piston.
Fig. 9 is a diagrammatic view showing the installation of our improved power actuator for operating the steering mechanism of a power boat or other vessel.
Fig. 10 is a diagrammatic view showing the application of our power actuator for operating simultaneously the brakes of an automotive vehicle and a trailer vehicle propelled thereby.
Fig. 11 is an enlarged detail view of the means including a flexible pipe for connecting the vacuum tank on the trailer with the intake manifold of the engine of the automotive vehicle.
Fig. 12 is a detail view illustrating one form of means for effecting the connection between the brake lever of the automotive vehicle and the actuating part of the motor actuator carried on the trailer.

In Fig. 9 we have illustrated diagrammatically an installation showing our power actuator arranged to operate the steering mechanism of a power boat driven by an internal combustion engine, by way of illustration. In this figure, 80, represents the hull of the boat, 81, the propeller, driven by an internal combustion engine, 82. 83 represents the rudder, 84, the tiller or arm for operating the same which in this installation would extend substantially transversely of the hull. 85 represents the steering lever or "stick" pivoted at 86, and located at any convenient point, as adjacent to the bow of the boat. 87 represents our power actuator constructed substantially as hereinbefore described, the valve actuating rod, 90, being connected by a link, 88, to the steering lever, 85, and the piston rod, 120, being connected by a link, 89, to the tiller or steering arm, 84. It will be understood that when the rudder is in neutral position, or in other words in line with the longitudinal axis of the boat, the piston of the actuator will be located substantially centrally in the cylinder. The cylinder is supported in fixed position in the hull by any suitable means. 91 represents the vacuum tank connected by pipe, 92, with the suction passage in the forward end of the cylinder, said tank being connected by a pipe, 93, with the manifold, 94, of the internal combustion engine, 82, and provided, as before stated, with a regulating valve, 95, and a check valve, 96. The vacuum tank, regulating valve and check valve perform, in this connection, the same functions as above described, and these functions are even more important in a construction where the higher pressure is obtained by burnt gases taken from a cylinder of the engine, as the introduction of too great a quantity of such burnt gases into the suction space, or manifold of the engine, would be more apt to stall the motor than the same quantities of air. In this instance we also employ a pressure tank, indicated at 97, connected by a pipe, 98, with a cylinder of the internal combustion engine, and provided with a pressure reducing valve 97a, a check valve, indicated at 99, being located in said pipe as closely as possible to the combustion chamber or cylinder of the engine, which is tapped for the purpose of supplying pressure to the pressure tank, 97, and the pressure tank is connected by a flexible pipe, 100, with the interior of the hollow piston rod, 120. In operating our power actuator under these conditions, the forward movement of the hand lever or steering lever, 85, will move the valve sleeve forward and connect the cylinder forward of the piston with the vacuum tank, 91, and the portion of the cylinder in rear of the piston with the pressure tank, 97, thus creating differential pressures which will cause the piston to instantly move forward as the lever, 85, is advanced, and if the lever, 85, is held stationary the piston will immediately be brought to a balanced condition as hereinbefore described. The rearward movement of the lever, 85, will likewise effect the return movement of the piston in the manner previously described. In this installation it will be seen that the difference of pressures necessary to secure the instantaneous operation of the actuator will always be present under all conditions. If the engine is running very slowly, with the throttle nearly closed, the pressure in the engine cylinder will be less, but the suction at the manifold between the throttle valve and the cylinders of the engine will be greater when the throttle is open wider. If the engine is running with the throttle well opened, or fully opened, there will be less suction at the manifold but the pressure in the cylinders will be greater and will supply the tank, 97, with the necessary pressure fluid to insure the operation of the actuator, and in intermediate positions of the throttle valve of the engine, there will always be sufficient differences of pressures to secure the operation of the device, for as the suction decreases the pressure increases, and vice versa.

It will be readily understood that the actuator can also be used in the same manner to operate any movable device, and in all cases the same delicate and accurate control of the actuated part is secured by the operation of the manually operated actuating part of the power actuator that is secured by ordinary manual operation, while the power necessary to actually operate the actuated part is supplied by the power actuator. It will also be understood that in all these installations, should the power fail for any reason, the manually operated device can instantly assume direct control of the actuated part as the movement of the hand lever or other manually actuated part in either direction will, as soon as the lost motion provided between the actuating and actuated parts is taken up, effect the movement of the actuated part in the direction in which the manually operated device is moved. It is unnecessary to employ any retracting spring to insure this result. In operating brake mechanism or any other actuated part which may be provided with a retracting spring, the said spring will of course assist in effecting the rearward movement of the piston, but is not essential to the operation of the mechanism except in case failure of pressure.

It should also be stated that where the power actuator is employed to operate a device like the rudder of a boat in both directions, where the normal position of the piston will be central between the ends of the cylinder, the additional sealing means consisting of the collar, 18, on the valve sleeve, 16, and the auxiliary valve seat, 18a will be omitted, and the inlet apertures, 16a, will be at all times in communication with the inlet port, 19, and inlet passage, 20. Additional sealing means provided by the valve collar, 18, is very convenient, however, in devices which lock the brakes of a vehicle, are only used intermittently as it assists in preventing leakage.

Our power actuator may also be conveniently employed for the operation of devices at a considerable distance, and even in another vehicle from that in which the engine or propelling means is located, as for example, in the case where an automotive vehicle is coupled in the usual or well known way with a trailer or separated vehicle, not provided with automotive means, as is becoming more and more common in the use of automobiles. In such cases it is extremely difficult to apply any braking pressure to the wheels of the trailer. In Figs. 10, 11 and 12, we have illustrated diagrammatically an automobile, indicated at 200, and a trailer, indicated at 201, mounted upon independent wheels and connected to the automobile by a coupling bar, 202, in any usual or preferred manner. In this instance we have shown brake mechanism for the rear wheels of the automobile, indicated at 203, and independent brake mechanism for the rear wheels of the trailer, indicated at 204. 205 indicates an internal combustion engine for propelling the automobile provided with the usual intake manifold, 206. The automobile is shown as provided with our power actuator, indicated at 207, the actuated part, 208, of which is connected by a link, 209, with a brake lever, 210, provided with a retracting spring, 211, while the piston rod, 212, is connected by a link, 213, with brake rods for applying the brakes, 203, in substantially the same manner as shown in Fig. 1. 214 is a vacuum tank connected to the passage, 20, of the power actuator by pipe, 215, and connected to the intake manifold, by pipe, 216, provided with the adjustable restricting valve, 217, and check valve, 218, similar to check valve 23b of Fig. 1. The trailer, 201, is also shown provided with one of our power actuators, indicated at 219, the actuated part, 220, of which is connected with the brake lever, 210, of the automobile, so that it will be actuated simultaneously with the movement of the actuated part of the power operator, 207. This may be accomplished in any desired manner, as for example by a connecting link, 221, extending from the brake lever, 210, to the rear of the automobile, and there being connected by detachable pin, 222, with a flexible wire or rod, 223, extending through a flexible metallic tube, 224, the forward end of which is clamped to some part of the frame of the automobile, by means of a detachable clamp, indicated at 225, the flexible rod, 223, being connected at its rear end to the actuating part, 220, of the power actuator carried by the trailer. This construction, illustrated in detail in Fig. 12, permits the removal of the flexible tube, 224, and flexible rod, 223, from the automobile when it is desired to separate the trailer from the automobile. The piston rod of the power actuator carried by the trailer and indicated at 226, is connected to the brake mechanism for actuating the brakes, 204, on the trailer in any desired manner, or as indicated in Fig. 1. 227 represents the vacuum tank for the power actuator of the trailer connected to the vacuum port, 20, of the power actuator, by pipe, 228, and connected also to the intake manifold of the engine. This may be accomplished by employing a pipe line, indicated at 229, 230 and 231, of which the section 230 may be a flexible rubber hose, the section, 229, being provided, as indicated in Fig. 11, with a cut off valve, 232, and a detachable coupling 233, so that the flexible pipe connection, 230, may be detached from the automobile when the trailer is not used and the valve, 232, will then be closed to prevent air passing to the manifold. With an installation of this kind, it will be seen that the flexible hose, 230, and the flexible rod, 223, and its protective covering, 224, will accommodate the movements of the trailer independent of the automobile, while maintaining the proper connection between the connected parts. When the foot lever, 210, is depressed, there will be a simultaneous operation of the power actuators, 207 and 219, thereby applying the brakes simultaneously to the wheels of both vehicles to the desired extent and preventing the trailer from throwing its load on a hill against the automobile in advance of it. When the foot lever is released, the brakes of both vehicles will be simultaneously released as the power actuators will operate in the manner hereinbefore described.

Where the power actuator is employed in connection with the steering mechanism of a boat, it is to be noted that the provision for lost motion between the manually actuated part and the actuated part of the power actuator will not only be an unobjectionable feature, but will, as a matter of fact, act to relieve the manually operated control mechanism, of shocks, which must otherwise be absorbed by the mechanism or by the hands of the operator, so that in such installations the power actuator not only acts to relieve the hands of the operator from the effort and consequent fatigue of operating the steering mechanism, but also acts as a cushioning device or automatic stabilizer for the steering mechanism itself, and to further relieve the operator from shocks or sudden movement imparted to the rudder, which would otherwise be transmitted to his hands.

In some instances if found desirable we may equip an automobile with a connection from the engine cylinder to the high pressure end of the actuator cylinder in the same manner as shown in Fig. 9. Thus in Fig. 10 we have shown a pressure tank 297 connected with a cylinder of the engine by a pipe 298, in which is located an adjustable regulating valve 297ª and a check valve 299, the tank 297 being connected by a flexible pipe 300 with the pressure side of the actuator in the same manner as illustrated in Fig. 9.

It is to be noted in connection with our invention that the storage space, or vacuum tank, does not serve the ordinary purpose for which storage tanks are usually employed, namely, to permit an intermittently operated power actuator to be operated by a pump or other source of power of insufficient capacity to operate the power actuator continuously. The internal combustion motor of an automotive vehicle has many times the capacity needed to operate our suction operated actuator continuously when the throttle valve is closed in the normal idling position and the motor turning over at the normal idling speed, but during such times the motor uses, relatively speaking, very small quantities of hydrocarbon fuel, which might be so diluted by intermittent admissions of relatively large quantities of air exhausted from the actuator that the motor would stall while idling. In our construction, the storage space or tank acts as an equalizer or regulator in connection with the restricting means, thus providing means for instantly withdrawing large quantities of air from the actuator cylinder to insure the prompt and immediate action of the piston, such air being gradually and more slowly delivered into the intake manifold under the action of the restricting valve, so as to prevent interference with the normal operation of the engine, and to positively prevent it from stalling. Our check valve also serves the important purpose of preventing explosive mixture from being drawn into the suction pipe, storage space and actuator cylinder, and valve mechanism, where its presence would do great harm, and might result in a serious explosion. When the throttle is closed, rarification would be produced in the suction pipe and storage space equal to that in the manifold. On the opening of the throttle, the degree of rarification in the manifold would gradually decrease, and in the absence of our check valve, the explosive mixture would be withdrawn from the manifold and carried back into the storage space, and if the valve mechanism happened to be in open position, it might even be withdrawn into the valve mechanism and the cylinder of the actuator. In case of a back fire in the manifold a serious explosion might result, which would demolish the servo-motor, and perhaps seriously injure the vehicle and its occupants, and in any event, the presence of explosive mixture would effect a deposit of gasoline which might reach the valve mechanism, the sealing means of which is preferably rubber, and this would quickly destroy such sealing means.
It is also to be noted that the employment of an actuator having a double acting piston in a single cylinder, closed at each end, in combination with automobile brake mechanism, as herein shown and described, produces extremely advantageous results. The brakes are not only applied by power, but are positively released by power, and the necessity for heavy retracting springs such as are ordinarily used in automobile brake mechanism, is rendered unnecessary. This is particularly important in connection with the installation of our servo-motor system in large busses or trucks, in which the strength of the operator may be insufficient, or barely sufficient, to apply the brakes. In such case the full force of the actuator can be applied to the brake mechanism, and a smaller actuator can be used than would be required if a heavy retracting spring must be overcome. In the event of the failure of the source of power, necessitating that the operator must exert his own strength to apply the brakes, as hereinbefore described, it will be seen that the use of the double acting piston is particularly important, as the operator does not have to use a considerable portion of his strength in overcoming a strong retracting spring, or springs, but can apply practically his entire strength to the brakes for the purpose of stopping the vehicle.

What we claim and desire to secure by Letters Patent is:—

1. A power actuator comprising among its members a power cylinder closed at both ends, a double acting piston in said cylinder, provided with a hollow piston rod extending through one end of the cylinder, and provided with an inlet aperture, a longitudinally movable reversing valve sleeve extending through the piston and into the hollow piston rod, and provided with separated ports, certain of said ports being connected with said inlet aperture, and other ports separated therefrom being adapted to be connected to an outlet passage from said cylinder, said piston being provided with ports and passages for connecting either of said separated sleeve ports with the cylinder on opposite faces of the piston, valves carried by said sleeve for controlling said piston ports and sleeve ports, and adapted when in an interjacent position between the limits of movement of said sleeve with respect to the piston to maintain the piston in balanced condition, said valve sleeve and cylinder being provided with auxiliary ports adjacent to the outlet passage, and auxiliary valve mechanism located at a distance from the reversing ports and controlling valves therefor for normally closing said ports when the valve sleeve is in normal position, to prevent leakage when the actuator is not in use, an actuated part connected with said piston rod, and a normally operated actuating part connected to said valve sleeve.

2. A power actuator comprising among its members, a power cylinder closed at both ends, a double acting piston in said cylinder provided with a hollow piston rod extending through one end of the cylinder and provided with an inlet aperture, a longitudinally movable reversing valve sleeve extending through the piston and into the hollow piston rod, said piston being provided with two separated valve chambers communicating by separated passages with the cylinder on opposite faces of the piston respectively, a collar valve mounted on the said sleeve in each of said valve chambers and fitting the walls of said chambers, said sleeve being provided with ports communicating with one of said chambers and being in communication with said inlet passage, said sleeve having ports separated from the said first mentioned ports by an impervious partition, and communicating with the other chamber in the piston, the cylinder being provided with an outlet passage on the opposite side of the piston from the inlet passage, said sleeve being provided with auxiliary ports adapted to be placed in communication with the outlet passage by the forward movement of the sleeve with respect to the piston, and auxiliary valve mechanism normally closing said auxiliary ports, an actuated part connected with the piston, and a manually operated actuating part connected with the valve sleeve.

3. A power actuator comprising among its members, a power cylinder closed at both ends, a double acting piston in said cylinder provided with a hollow piston rod extending through one end of the cylinder and provided with an inlet aperture, a longitudinally movable reversing valve sleeve extending through the piston and into the hollow piston rod, said piston being provided with two separated valve chambers communicating by separated passages with the cylinder on opposite faces of the piston respectively, a collar valve mounted on the said sleeve in each of said valve chambers and fitting the walls of said chambers, said sleeve being provided with ports communicating with one of said chambers and being in communication with said inlet passages, said sleeve being provided with ports communicating with one of said chambers and being in communication with said inlet passage, said sleeve having ports separated from the said first mentioned ports by an impervious partition, and communicating with the other chamber in the piston, the cylinder being provided with an outlet passage on the opposite side of the piston from the inlet passage, said sleeve being provided with auxiliary ports adapted to be placed in communication with the outlet passage by the forward movement of the sleeve with respect to the piston, and auxiliary valve seats in said piston chambers adapted to be engaged by the said collar valves when the sleeve is moved forwardly with respect to the piston, an actuated part connected with the piston rod, and a manually operated part connected with said sleeve.

4. A power actuator comprising among its members, a power cylinder closed at both ends, a double acting piston in said cylinder, provided with a hollow piston rod extending through one end of the cylinder and being provided with an inlet passage, a longitudinally movable valve sleeve extending through the piston and into said hollow piston rod and fitting tightly within the same, the piston being provided with separated chambers surrounding separated portions of said sleeve and communicating with the interior of the cylinder on opposite sides of the piston respectively, a collar valve on said sleeve in each of said chambers for controlling said passages, said sleeve being provided with ports communicating with the inlet passage and normally communicating with one of said chambers in the piston, and adapted to be brought into communication with the other of said chambers by the forward movement of the sleeve, said sleeve having another series of ports normally in communication with the other piston chamber, separated from said first mentioned ports by an impervious partition and adapted to be brought into communication with the cylinder on the forward side of the piston by the longitudinal movement of the sleeve, and to be closed by the following movement of the piston, said cylinder having an outlet passage at the end opposite the piston rod, and said sleeve being provided with normally closed auxiliary ports adapted to be placed in communication with said outlet passage by the forward movement of the sleeve, means for limiting the relative movement of the sleeve with respect to the piston in both directions, an actuated part connected with the piston rod, and a manually operated actuating part connected with said sleeve.

5. A power actuator comprising among its members, a power cylinder closed at both ends, a double acting piston in said cylinder, provided with a hollow piston rod extending through one end of the cylinder and being provided with an inlet passage, a longitudinally movable valve sleeve extending through the piston and into said hollow piston rod and fitting tightly within the same, the piston being provided with separated chambers surrounding separated portions of said sleeve and communicating with the interior of the cylinder, on opposite sides of the piston respectively, a collar valve on said sleeve in each of said chambers for controlling said passages, said sleeve being provided with ports communicating with the inlet passage and normally communicating with one of said chambers in the piston, and adapted to be brought into communication with the other of said chambers by the forward movement of the sleeve, said sleeve having another series of ports normally in communication with the other piston chamber, separated from said first mentioned ports by an impervious partition and adapted to be brought into communication with the cylinder on the forward side of the piston by the longitudinal movement of the sleeve, and to be closed by the following movement of the piston, said cylinder having an outlet passage at the end opposite the piston rod, and a port communicating with said outlet passage, and an annular part in rear of said port fitting said sleeve, said sleeve being provided with auxiliary outlet ports adapted to be closed by said annular port, and with an annular auxiliary valve for closing said outlet port when the sleeve is in its normal position, an actuated part connected with the piston rod, and a manually operated actuating part connected with said sleeve.

6. A power actuator comprising among its members a power cylinder closed at both ends, a double acting piston in said cylinder provided with a hollow piston rod extending through one end of the cylinder, and provided with an inlet aperture, a longitudinally movable reversing sleeve extending through the opposite end of the cylinder, through the piston and into the hollow piston rod, and provided with separated ports, certain of said ports being connected with said inlet aperture, and others of said ports being adapted to be connected to an outlet passage from the cylinder, said piston being provided with separated cylindrical chambers connected by lateral ports and passages, the one with the cylinder on one side of the piston, and the other with the cylinder on the other side of the piston, each of said chambers being provided with a transversely disposed annular valve seat, a collar valve on said valve sleeve within each of said chambers, each having a lateral surface for opening and closing the piston port, and a transversely disposed annular portion to engage the transverse annular valve seat in said chamber to prevent leakage, a manually operated device connected to the valve sleeve, and an actuated device connected with the piston rod.

7. In a servo-motor system, the combination with an internal combustion engine, provided with a suction passage for explosive charges, of a power actuator comprising a cylinder, a piston movable therein, and reversing valve mechanism, a suction pipe or passage connecting the reversing valve mechanism of the actuator with the suction passage of the engine, and restricting means in said suction pipe or passage between the actuator and the suction passage of the engine for preventing any air withdrawn from the actuator from being delivered into the suction passage of the engine in such large quantities at a time as to materially interfere with the normal operation of the engine under the control of the throttle valve or to stall the engine if idling, means for connecting the reversing valve mechanism of the actuator to the explosive chamber, of a cylinder of the engine for enabling pressure higher than atmosphere to be applied to one side of the actuator piston simultaneously with the connection of the said suction pipe with the actuator cylinder on the other side of the piston, to insure the effective operation of the actuator piston by either suction or pressure from engine, or both.

8. Brake mechanism comprising, in combination, an air brake, mechanical connections for operating the brake independently of the air pressure, and an air valve controlling the air brake and forming a tension element in said connections and arranged to operate the air brake when tension is applied to said connections.

In testimony whereof we affix our signatures.

CALEB S. BRAGG.
VICTOR W. KLIESRATH.